United States Patent [19]

Saksun

[11] Patent Number: 5,303,935
[45] Date of Patent: Apr. 19, 1994

US005303935A

[54] FLUID SEAL

[75] Inventor: John Saksun, Islington On, Canada

[73] Assignee: Saksun Holdings Limited, Toronto, Canada

[21] Appl. No.: 935,094

[22] Filed: Aug. 25, 1992

Related U.S. Application Data

[63] Continuation-in-part of Ser. No. 847,408, Mar. 6, 1992, abandoned.

[30] Foreign Application Priority Data

Feb. 3, 1992 [CA] Canada ................................ 2060575

[51] Int. Cl.⁵ .............................................. F16J 15/32
[52] U.S. Cl. .................................... 277/152; 277/37; 277/181; 277/208
[58] Field of Search ...................... 277/33, 35, 37, 152, 277/153, 164, 166, 181, 186, 189, 208; 384/15, 32, 477, 484, 486

[56] References Cited

U.S. PATENT DOCUMENTS

| | | | |
|---|---|---|---|
| 2,214,261 | 9/1940 | Roth | 277/189 X |
| 2,272,029 | 2/1942 | Benson | 277/152 X |
| 2,272,650 | 2/1942 | Von Veh . | |
| 2,309,446 | 1/1943 | Ekkebus | 277/189 X |
| 2,437,901 | 3/1948 | Winkeljohn | 277/153 |
| 2,635,907 | 4/1953 | Heimbach | 277/189 |
| 2,736,583 | 2/1956 | Marvin | 277/153 |
| 2,772,931 | 12/1956 | Biedermann | 277/208 X |
| 2,983,529 | 5/1961 | Price | 277/208 X |
| 2,992,027 | 7/1961 | Wright et al. | 277/153 X |
| 3,218,885 | 11/1965 | Puidokas | 277/189 X |
| 3,285,616 | 11/1966 | Doutt | 277/181 |
| 3,443,845 | 5/1969 | Walchle et al. . | |
| 3,455,564 | 7/1969 | Dega | 277/153 X |
| 3,575,425 | 4/1971 | Saksun . | |
| 3,601,417 | 8/1971 | Szepesvary . | |
| 3,601,457 | 8/1971 | Helms | 384/486 X |
| 3,837,660 | 9/1974 | Poggio . | |
| 3,848,881 | 11/1974 | Ginn | 277/181 |
| 4,026,563 | 5/1977 | Bainard . | |
| 4,052,112 | 10/1977 | Faber . | |
| 4,108,447 | 8/1978 | Scholin . | |
| 4,240,643 | 12/1980 | Becker et al. . | |
| 4,261,583 | 4/1981 | de Vries, Jr. et al. | 277/152 |
| 4,274,641 | 6/1981 | Cather, Jr. | 277/153 |
| 4,280,741 | 7/1981 | Stoll | 277/152 X |
| 4,300,788 | 11/1981 | Gagne | 277/153 |
| 4,316,579 | 2/1982 | Ray et al. | 277/152 X |
| 4,401,307 | 8/1983 | Dechavanne | 277/152 X |
| 4,493,490 | 1/1985 | Ohma | 277/152 X |
| 4,517,140 | 5/1985 | Rawlings . | |
| 4,616,837 | 10/1986 | Beutel | 277/153 |
| 4,834,397 | 5/1989 | Shimasaki et al. . | |
| 4,928,577 | 5/1990 | Stoll | 384/32 X |
| 5,118,206 | 6/1992 | Otto et al. | 384/484 X |
| 5,137,285 | 8/1992 | Pick | 277/153 X |

FOREIGN PATENT DOCUMENTS

| | | | |
|---|---|---|---|
| 758652 | 8/1951 | Fed. Rep. of Germany | 277/153 |
| 834627 | 3/1952 | Fed. Rep. of Germany | 277/153 |
| 861346 | 12/1952 | Fed. Rep. of Germany | 277/153 |
| 3014117 | 10/1981 | Fed. Rep. of Germany | 277/152 |
| 876866 | 11/1942 | France | 277/153 |
| 59812 | 12/1948 | France . | |
| 20528 | 6/1972 | Japan | 277/153 |
| 92468 | 5/1959 | Netherlands | 277/153 |
| 877184 | 11/1981 | U.S.S.R. | 277/152 |

(List continued on next page.)

Primary Examiner—William A. Cuchlinski, Jr.
Assistant Examiner—Scott W. Cummings
Attorney, Agent, or Firm—Bereskin & Parr

[57] ABSTRACT

An annular fluid seal made of an elastomeric material has a body with a radially outer surface and a radially inner surface. The outer surface is contoured to be insertable into the opening in the end of a cylinder. The inner surface has at one side a radially inwardly extending sealing lip for slidably engaging and sealing a piston rod, and at the other side it has a radially inwardly extending wiping flap for wiping the piston rod. Between the sealing lip and the wiper flap is a radially inwardly extending guide member slidably engaging the rod for guiding the rod through the seal. The guide member is much wider than the sealing lip or wiper flap, to withstand radial forces imposed by the rod which would otherwise tend to distort the seal and cause it to leak.

28 Claims, 8 Drawing Sheets

FOREIGN PATENT DOCUMENTS

| | | |
|---|---|---|
| 544881 | 2/1941 | United Kingdom . |
| 544732 | 4/1942 | United Kingdom ................ 277/153 |
| 591698 | 5/1945 | United Kingdom . |
| 580871 | 9/1946 | United Kingdom ................ 277/153 |
| 625604 | 6/1949 | United Kingdom ................ 277/153 |
| 712847 | 8/1954 | United Kingdom ................ 277/153 |
| 742211 | 12/1955 | United Kingdom ................ 277/153 |
| 874010 | 8/1961 | United Kingdom ................ 277/208 |
| 2144184 | 8/1983 | United Kingdom . |
| 2242713 | 10/1991 | United Kingdom ................ 277/152 |

FLUID SEAL

FIELD OF THE INVENTION

This application is a continuation-in-part of application Ser. No. 847,408 filed on Mar. 6, 1992 now abandoned. This invention relates to fluid seals for fluidly sealing between two relatively moveable members.

BACKGROUND OF THE INVENTION

Hydraulic systems usually convert fluid pressure to linear force by applying the fluid pressure to an end of a cylindrical piston which slides axially in a matching bore. A piston rod extends from the piston or shaft out through at least one end of the bore. To avoid loss of fluid and fluid pressure from the system, it is necessary to provide a seal between the piston rod and the end of the bore.

Typical fluid seals for use in hydraulic systems include a metal "cup" having a circular opening across most of its bottom. An elastomeric material is bonded around the inside of the metal cup and extends radially inwardly to define a lip encircling the opening in the cup. In use, the cup is pressed into a suitable recess at the end of the cylindrical bore and the lip extends into the bore to press against the sides of the piston rod and take up any space between the bore and the piston rod. To ensure that the lip presses against the piston rod and that the lip maintains its shape, the lip has a groove extending around it behind its sealing face and an annular metal spring is mounted in the groove.

Although attempts have been made to eliminate the metal cup and make the seal entirely of a resilient material, such attempts have previously met with little success. The sealing face of a seal is preferably relatively soft to contour around the cylindrical piston rod and minimize leakage. In some applications, such a soft seal without a metal cup will not be retained strongly enough in the cylindrical bore and will be dislodged as the piston rod is moved or if suction is applied. An example of an application where soft resilient seals have been found ineffective is in automobile power steering racks. Although a harder seal will not be dislodged or sucked out, harder seals do not usually have adequate sealing capabilities.

In addition, in power steering racks the piston rod is sometimes subjected to radial forces. When this occurs, the rod tends to distort the seal and the shape of the sealing lip. Such distortion can cause the lip to lose sealing engagement with the rod, resulting in the loss of fluid and fluid pressure from the power steering system.

It is an object of the present invention in one aspect to provide a fluid seal having a plurality of surfaces for engaging the movable member in a fluidly sealing manner and to guide the movable member through the seal.

It is a further object of the present invention to provide a fluid seal without a metal cup which will nevertheless resist being dislodged by relative axial movement between the components being sealed.

It is a still further object of the present invention to provide a fluid seal which is resistant to abrasive wear by dirt adhering to the surface of the moveable member.

SUMMARY OF THE INVENTION

In one aspect the invention provides a fluid seal comprising:

(a) an annular body of an elastomeric material having a radially outer surface and a radially inner surface;
(b) said outer surface being contoured to be insertable into a generally cylindrical opening; and
(c) said inner surface having:
  (i) a radially inwardly extending sealing lip having a sealing face for slidably engaging a generally cylindrical shaft in a fluidly sealing manner; and
  (ii) a radially inwardly extending guide member axially spaced from said sealing lip and having a guide face adapted to slidably engage the shaft for guiding the shaft through the seal, said guide face being substantially wider than said sealing face and said guide member being adapted to resist radial movement of said shaft, thereby to limit distortion of said sealing lip, said sealing lip and said guide member being separated by a first channel therebetween, said first channel extending radially outwardly of said inner surface and extending around the circumference of said inner surface.

In another aspect the invention provides a fluid seal comprising:

(a) an annular body of elastomeric material having a radially outer surface, a radially inner surface and first and second opposite side faces, said outer surface being contoured to be insertable into a generally cylindrical opening;
(b) an annular washer of rigid material generally coaxial with the annular body and embedded in said body adjacent said second sideface;
(c) said inner surface of said body having:
  (i) a radially inwardly extending sealing lip having a sealing face for slidably engaging a generally cylindrical shaft in a fluidly sealing manner; and
  (ii) a radially inwardly extending guide member axially spaced from said sealing lip and having a guide face adapted to slidably engage the shaft for guiding the shaft through the seal, said guide face being substantially wider than said sealing face and said guide member being adapted to resist radial movement of said shaft, thereby to limit distortion of said sealing lip, said sealing lip and said guide member being separated by a first channel therebetween, said first channel extending radially outwardly of said inner surface and extending around the circumference of said inner surface.

In a further aspect the invention provides a fluid seal comprising:

(a) an annular body of an elastomeric material having a radially outer surface and a radially inner surface;
(b) said outer surface being contoured to be insertable into a generally cylindrical opening; and
(c) said inner surface having:
  (i) a radially inwardly extending sealing lip having a sealing face for slidably engaging a generally cylindrical shaft in a fluidly sealing manner;
  (ii) a radially inwardly extending wiping flap for slidably engaging said shaft, said wiping flap being laterally spaced from said sealing lip; and
  (iii) a guide member located between said sealing lip and said wiping flap, said guide member comprising a metal washer and having a guide face adapted to slidably engage said shaft for guiding said shaft through said seal and for resisting radial movement of said shaft, said guide face being substantially wider than said sealing face.

DESCRIPTION OF THE DRAWINGS

A preferred embodiment of the present invention is described below with reference to the accompanying drawings in which.

DESCRIPTION OF THE PREFERRED EMBODIMENT

Figure 1:
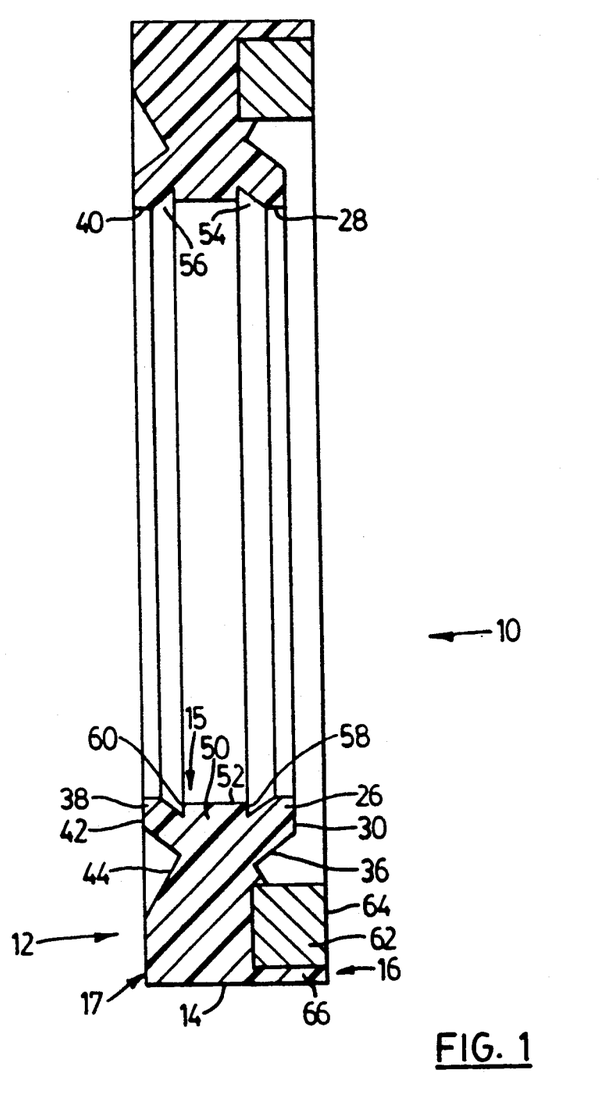
FIG. 1 is a cross sectional view through a fluid seal according to the present invention.
Figure 1A:
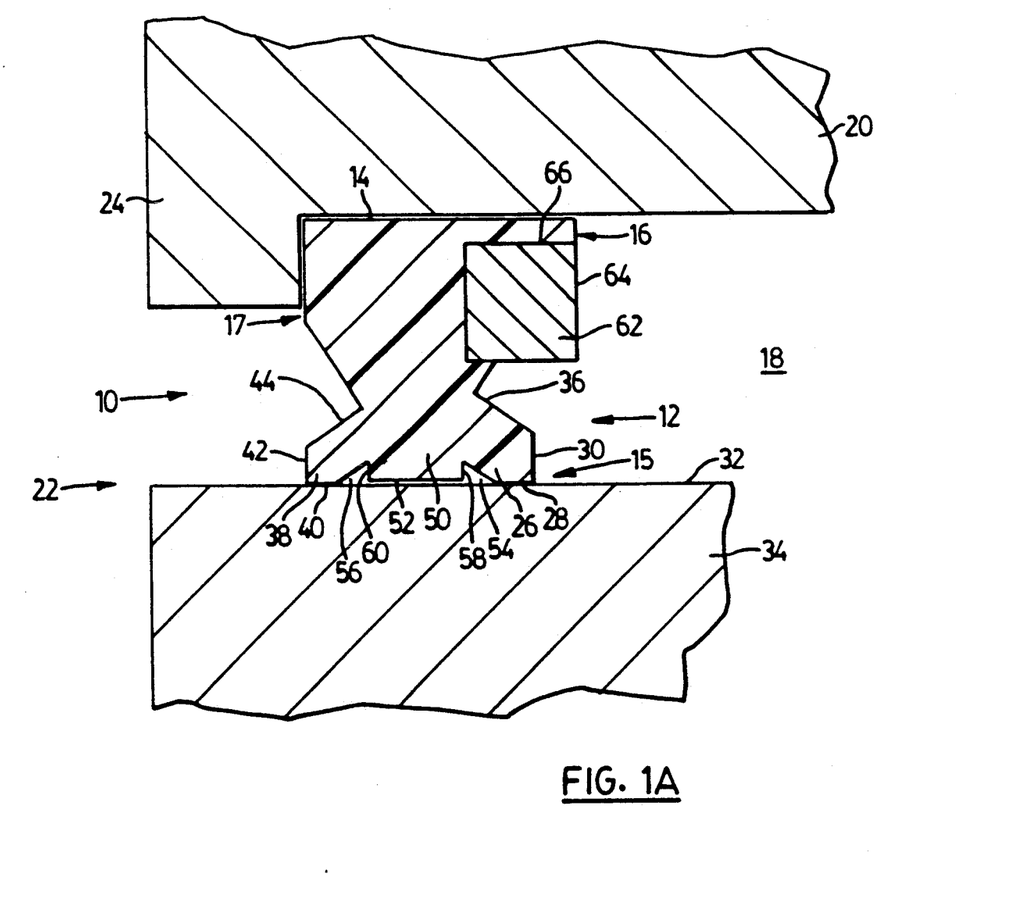
FIG. 1A is an enlargement of the encircled area of FIG. 1.
Figure 2:
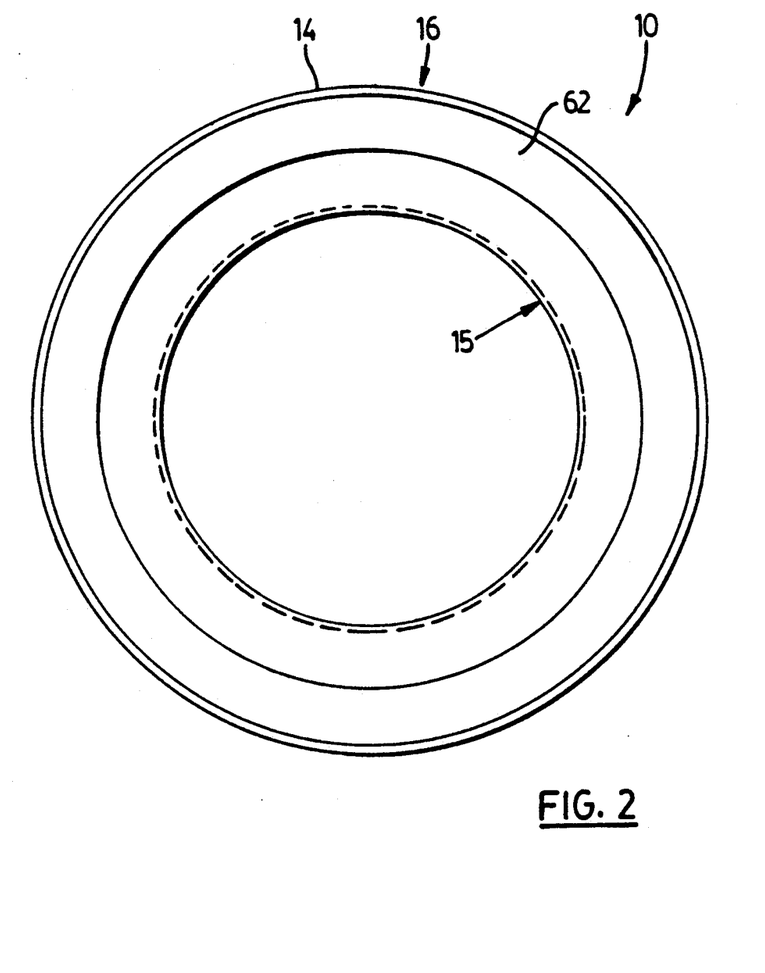
FIG. 2 is an elevated end view of the invention shown in FIG. 1.

Reference is first made to FIGS. 1, 1A, 2, which show a fluid seal 10 having an annular body 12. Body 12 is formed of an elastomeric material and has a generally constant cross section. The body 12 has a radially outer surface 14 and a radially inner surface 15, and has as illustrated a right face 16 and a left face 17.

Figure 3:
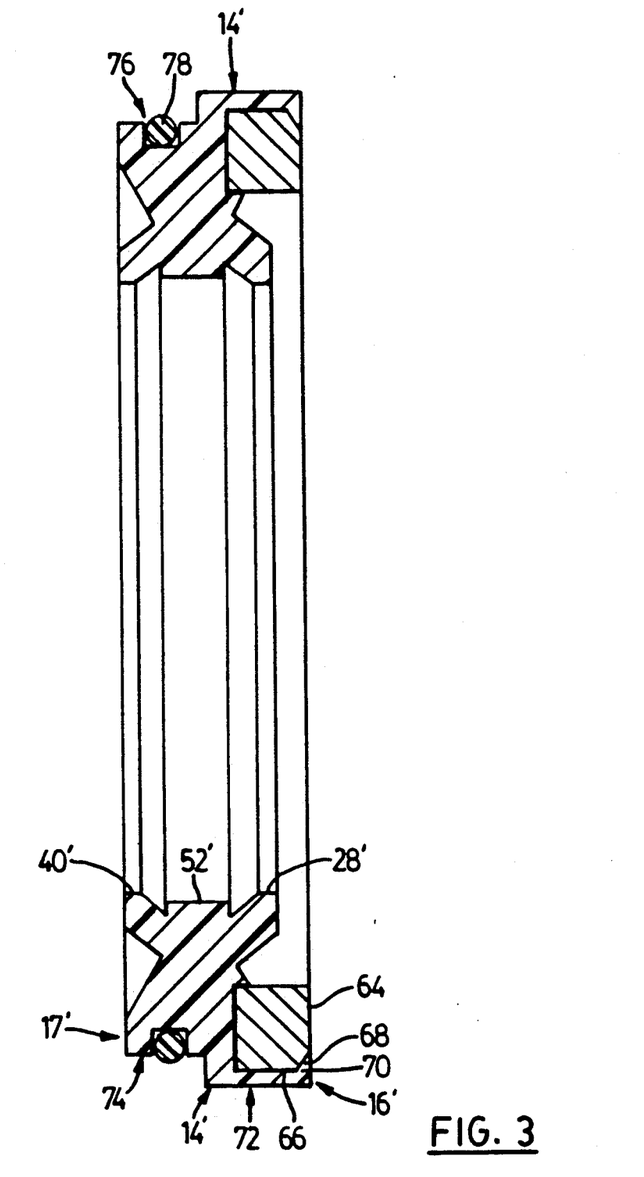
FIG. 3 is a cross sectional view of another embodiment of the invention.

The radially outer surface 14 is contoured for insertion into one end of the cylindrical hollow interior 18 of a tube or cylinder 20 see FIG. 1A). In this embodiment of the invention, the contour of the outer surface 14 is flat as opposed to a stepped profile of another embodiment as shown in FIG. 3 and discussed below. Once inserted into the hollow interior 18, the seal 10 is pressed towards opening 22 at the end of cylinder 20 and into an engagement with a lip 24 of the cylinder 20. The diameter of the outer surface 14 of the seal 10 is marginally larger, or oversized, than the diameter of the hollow interior 18 to provide a tight frictional fit and fluid sealing engagement between the seal 10 and the cylinder 20. Preferably, the diameter of the outer surface 14 will be 0.008 in. to 0.015 in. oversized as compared with opening 22, although this range may vary depending on the type of elastomeric material employed in the seal 10 and the desired tightness of the frictional fit. If desired the left hand edge (as drawn) of the outer surface 14 may be bevelled to facilitate insertion of the seal 10 into the cylinder 20.

The radially inner surface 15 of the seal 10 has a sealing lip 26 extending radially inwardly about its circumference. The sealing lip 26 has a sealing face 28 generally coaxial with the fluid seal 10 and a right end surface 30 generally perpendicular to the sealing face 28. The sealing face 28,, presses against the surface 32 of a piston rod or shaft 34 which is axially moveable relative to the seal. Preferably, the diameter of the opening provided by the sealing lip 26 is 0.010 in. to 0.025 in. less, or undersized, than the diameter of the surface 32 of the piston rod 34 to provide a good seal between the sealing face 28 and the rod 34. A first V-shaped groove 36 extends into the right face 16 of the seal 10 above the respective right end surface 30 of the sealing lip 26 to facilitate flexing of lip 26. It will be appreciated that the groove 36 may also be rounded.

The radially inner surface 15 of seal 10 also has a wipe flap 38, located adjacent the left face 17. The wipe flap 38 extends radially inwardly about the circumference of the fluid seal 10. The wipe flap 38 has a wiping face 40 generally coaxial with the fluid seal 10 and a left end surface 42 generally perpendicular to the wiping face 40. The wiping face 40 presses against the surface 32 of the rod 34. A second V-shaped groove 44 extends into the face 17 of the fluid seal 10 above the left end surface 42 of the wiping flap 38 to facilitate flexing of flap 38. The wipe flap 38 is generally "thinner" than the sealing lip 26. Hence, in this embodiment, the width of the left end surface 42 is less than the width of the right end surface 30. It will be appreciated that the groove 44 may also be rounded.

The radially inner surface 15 of the seal 10 further has a guide member 50 extending radially inwardly about its circumference and located between the sealing lip 26 and wipe flap 38. The guide member 50 has a guide face 52 generally coaxial with the fluid seal 10 and right and left guide end faces 58, 60 generally perpendicular to the guide face 52. The guide face 52 contacts the surface 32 of the rod 34. The guide member 50 is spaced apart from the sealing lip 26 by a right channel 54 and from the wipe flap 38 by a left channel 56. Both the channels 54, 56 are V-shaped, although they may be rounded, and they extend radially outwardly of the inner surface 15 of the seal 10 about its circumference. In this embodiment, the width of the right channel 54 is greater than the width of the left channel 56 so that the sealing lip 26 is spaced further away from the guide member 50 than the wipe flap 38 is spaced from the guide member 50. The width of the guide face 52 is also greater than the width of either the sealing face 28 or the wiping face 40.

The fluid seal 10 is stiffened by a washer 62 of rigid material. The washer 62 is rectangular in cross-section, although other shapes can be used (for example, the washer may have a chamfer in one corner, be V-shaped, parallelogram shaped, or in the form of a truncated triangle, etc.). The washer 62 is generally circular in end view (see FIG. 2), although it may take other forms as required (for example, it can be oval shaped, or it may be serrated, etc.) In the preferred embodiment the washer 62 is a conventional ⅜ in. steel washer. The washer 62 is generally co-axial with the seal 10 and is embedded in the seal adjacent its right face 16 such that an outside face 64 of the washer 62 is coplanar or flush with the right face 16. In this embodiment the radially outer surface 66 of the washer 62 has a smaller diameter than the radially outer surface 14 of the seal 10 so that the elastomeric material of the seal 10 covers the washer outer surface 66. This configuration increases the surface area of the outer surface 14 in contact with the cylinder 20 to enhance the frictional fit and fluid sealing engagement between the seal 10 and the cylinder 20.

The use of the invention will be described shortly, but first another embodiment of the invention will be described as shown in FIG. 3. Primed numerals are used to identify like elements from the first embodiment. In the FIG. 3 embodiment, the outer surface 14¹ of the seal 10¹ has a stepped profile so that the outer surface 14¹ has a larger diameter part 72 toward the right face 16¹ and a smaller diameter part 74 toward the left face 17¹. The stepped profile of the outer surface 14¹ enables the smaller diameter part 74 of the fluid seal 10¹ to be pressed into a stepped cylindrical opening having a contour generally corresponding to that of the smaller part 74.

A groove 76 may be provided in the seal $10^1$. The groove 76 extends radially inwardly into the smaller diameter part 74 of the outer surface $14^1$ and extends circumferentially around the fluid seal $10^1$. The groove 76 accepts an O-ring 78 of a resilient material to provide additional fluid sealing between the smaller diameter part 74 of the outer surface $14^1$ of the fluid seal 10 and the stepped cylindrical opening into which the seal $10^1$ is inserted.

An edge 68 of the washer 62 between the outside face 64 and the outer surface 66 may be bevelled and a lip 70 provided to resist the dislodging of the washer 62 from the seal $10^1$. Additionally, a suitable adhesive may be used to bond the washer 62 to the seal 10.

Figure 4:
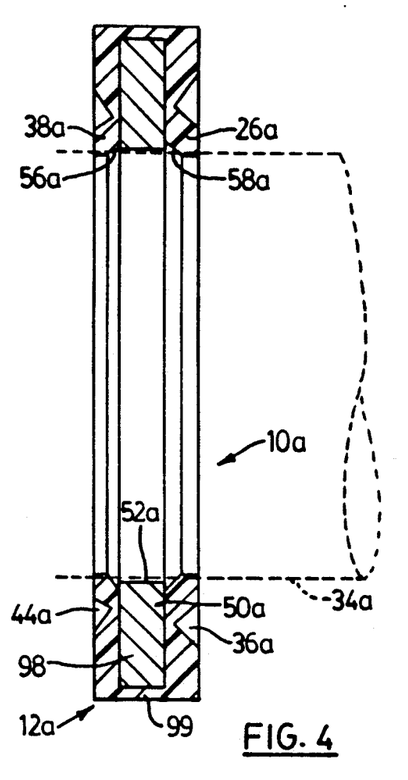
FIG. 4 is a cross sectional view of a further embodiment of the invention.

Reference is next made to FIG. 4, which shows another embodiment of the invention. In FIG. 4 reference numerals with the suffix "a" indicate parts corresponding to those of FIGS. 1 to 3. In the FIG. 4 embodiment, the guide member 50a is formed as a separate member. Specifically, it has the form of a washer 98 embedded in the body 12a. The washer or guide member 98 may be made of any suitable material, e.g. metal, nylon or hard plastic such as a urethane which is harder than that from which the remainder of the seal is formed. In a preferred embodiment the washer 98 is phosphor bronze.

In FIG. 4 the piston rod 34a is shown in dotted lines. It will be seen, as before, that the sealing lip 26a and the wiper flap 38a are undersized as compared with the diameter of piston rod 34a. Typically lip 26a and flap 38a are each 0.030 to 0.040 in. undersized in diameter (i.e. 0.015 to 0.020 in. per side) as compared with the diameter of rod 34a. However the opening defined by the guide member face 52a is now either the same size as the diameter of piston rod 34a, or preferably, it is slightly larger than the diameter of piston rod 34a. Typically the opening defined by guide face 52a is 0.005 to 0.010 in. in diameter greater than that of rod 34a (i.e. 0.0025 to 0.005 per side greater), to allow a slight clearance between the guide face 52a and the rod 34a.

Thus, in use, if there are no radial forces acting against rod 34a, rod 34a will normally not contact guide face 52a (or will contact it with little pressure). However as soon as radial forces act on rod 34a (as is common for automobile rack and pinion steering), the rod 34a will be forced sideways against the guide face 52a. Guide face 52a will resist or absorb these forces, thereby preventing sealing lip 26a and wiper flap 38a from distorting unduly. This will reduce the likelihood of leakage.

The washer 98 also performs the same function as washer 64 of FIG. 1, i.e. it stiffens the body of seal 10a and thus helps prevent the seal from being squeezed out through opening 22 by fluid pressure (which can reach 1200 psi in some automotive power steering mechanisms, for example). For this purpose the washer 98 extends nearly to the outer surface of seal 10a, being covered only by a very thin layer 99 of elastomeric material. To produce the seal 10a, the washer 98 is suitably located in a mold, and then the elastomeric material is flowed around the washer.

Figure 5:
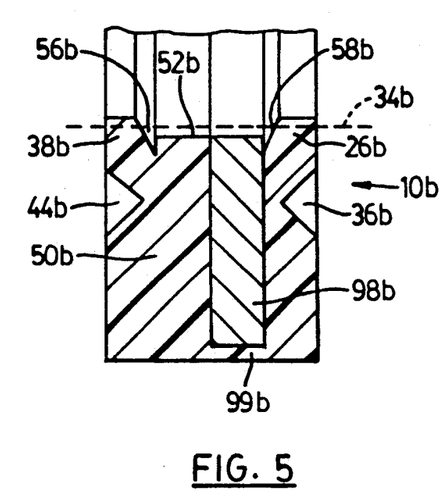
FIG. 5 is a cross sectional view of a further embodiment of the invention.

Reference is next made to FIG. 5, which shows an embodiment similar to that of FIG. 4 and in which reference numerals with the suffix "b" indicate parts corresponding to those of FIGS. 1 to 4. In the FIG. 5 embodiment, the guide member 50b is formed as to about half of its width by the washer 98b, and as to the remaining half of its width by the same elastomeric material as that used to form the remainder of the seal 10b. The washer 98b is again preferably of metal such as phosphor bronze. The FIG. 5 embodiment functions in the same manner as the FIG. 4 embodiment. It will be realized that two or more washers 98b, spaced laterally apart by elastomer, can be used to form the guide member 50b.

Figure 6:
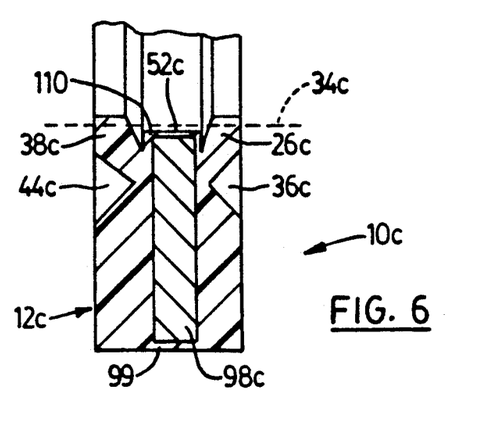
FIG. 6 is a cross sectional view of a still further embodiment of the invention.

Reference is next made to FIG. 6 in which reference numerals with the suffix "c" indicate parts corresponding to those of FIGS. 1 to 4. The embodiment of FIG. 6 is the same as that of FIG. 4, except that washer 98c is now embedded in the body 12c so that its radially inner surface is covered with a thin layer 110 of the same material as that of body 12c, e.g. urethane. Layer 110 may be e.g. 0.005 to 0.015 in. thick. Washer 98c thus serves as before to prevent radial movement of rod 34c which could otherwise unduly distort sealing lip 28c and wiper flap 38c, but at the same time the metal of washer 98c does not itself contact the shaft 34c.

In use, the first face 16 of the seal 10 is exposed to a pressurized fluid, such as hydraulic oil. The oversizing of the sealing lip 26 (as discussed above), and the resiliency of the seal in combination with the pressure of the fluid, presses the sealing face 28 toward the surface 32 of the piston rod 34 to prevent fluid from leaking between the seal 10 and the piston rod 34. The pressure of the fluid also presses the left face 17 of the seal 10 against the lip 24 of the cylinder 20 to hold the seal 10 in the opening 22 without additional positive locking of the seal in place. The contact of the left face 17 with the lip 24 provides additional fluid sealing engagement between the seal 10 and the cylinder 20.

In order to maintain effective sealing, it is important that the sealing face 28 not be damaged nor the sealing lip 26 distorted. To minimize damage, any dirt accumulating on the surface 32 of the piston rod 34 should be removed. As the pressurized side of the seal is generally a closed system, the worst dirt accumulation problem will occur on the exposed part of the surface 32 which is to the left of the seal as viewed in FIGS. 1 and 1A. The wipe flap 38 wipes such dirt from the piston rod 34 as it is moved along the seal.

Likewise, the sealing face 28 should not be nicked or damaged during installation of the seal 10 on the rod 34, otherwise the seal is rendered useless. Special care is required when the seal 10 must be installed over sharp surfaces, such as gears or threaded portions of rods. It may be difficult, if not impossible to simply slide the seal 10 over such sharp surfaces and avoid contact therewith since the lip 26 (and flap 38) is undersized. Hence, an installation aid or device is preferably employed to avoid any damage to the sealing face 28.

Figure 7:
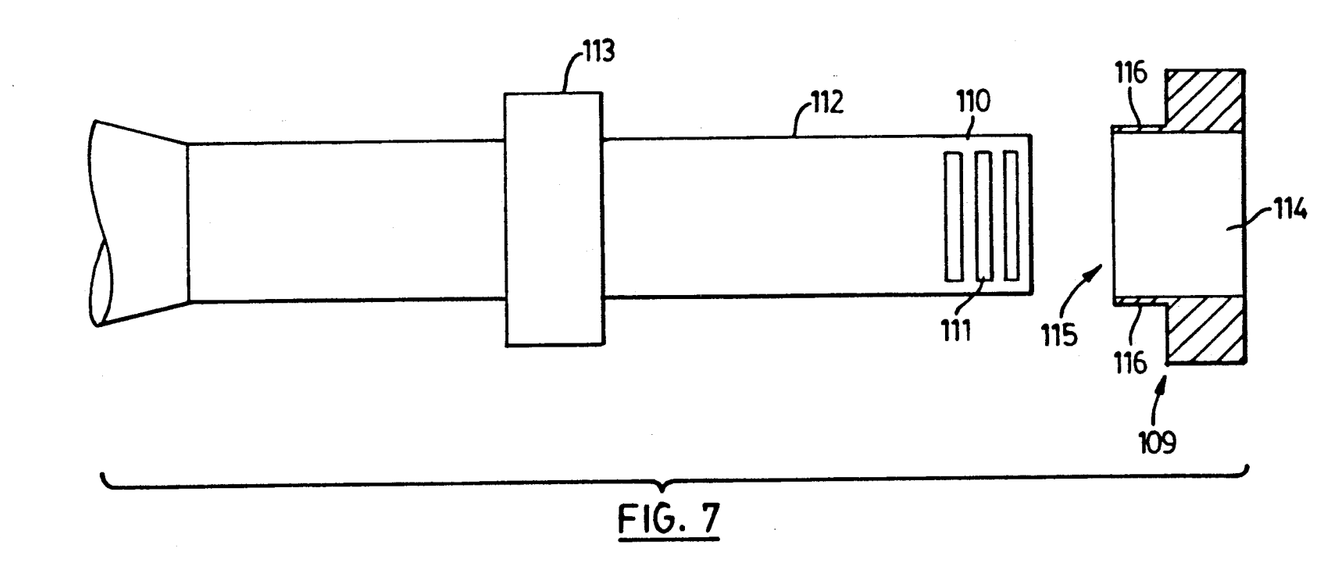
FIG. 7 shows an installation device for fluid seals according to the present invention.

An example of one such installation device for an automobile rack and pinion assembly is indicated in FIG. 7 by reference numeral 109. In this example the seal 10 must be installed into a piston 113 (comparable to cylinder 20) by sliding the seal over a rack 110 (having gears 111) and along a shaft 112 (comparable to piston rod 34). The installation device 109 has a hollow interior 114 adapted to fit over the rack 110 and shaft 112. A first end 115 of the device 109 has a cylindrical wall 116, preferably about 0.012 to 0.015 thick, adapted to receive the sealing lip 26, guide member 50 and wipe flap 38 of the seal 10. Since the inside diameter of the wall 116 is slightly larger than the diameter of the shaft 112 and the lip 26, and flap 38 are undersized, it will be apparent that the lip 26, flap 38 and guide member 50 must be stretched to fit onto the outside surface of the wall 116. With the seal 10 located on the device 109, the seal 10 is then inserted, wipe flap 38 first or lip 26 first as required, over the rack 110 and the shaft 112 into piston 113. The seal 10 is then slid off the device 109 and onto the shaft, and the device 109 is removed from the shaft.

The rod 34 is in use subjected to axial forces which move the rod axially relative to the seal 10 and may commonly be subjected to radial forces which push the piston rod 34 towards one side of the cylinder 20. When this occurs, the rod 34 exerts pressure on the seal 10 which can distort the seal 10, and particularly the sealing lip 26, thereby causing leakage. However, in the seal of the present invention, the rod 34 presses against the guide face 52 of the guide member 50 which transmits these pressures through the seal to the cylinder 20, thereby eliminating or reducing the distortion of the sealing lip 26. Distortion to the wipe flap 38 is likewise reduced or eliminated. Since guide 50 is not required to seal anything, it need not flex sideways (unlike lip 36 or wiper 38), so it can be shaped to withstand better the radial forces imposed by piston rod 34. Thus, guide face 52 is normally much wider than faces 28 or 40. In a typical example each of faces 28, 40 may be 0.030 inches wide, while guide face 52 may be about 0.120 inches wide, or twice as wide as faces 28, 40 taken together.

It will be appreciated that since the body 12 of the seal 10 is generally symmetrical about a vertical axis, pressurized fluid could be applied to the left face 17 of the seal 10 in which case the wipe flap 38 would act as a fluid seal and the sealing lip 26 would act as a wiper. Such an arrangement would however require fluid pressures low enough not to dislodge the seal, or else would require a positive locking of the seal in place other than the frictional fit between the outer surface 14 of the seal 10 and the cylinder 20. For example a separate retainer ring could be used to hold the seal in place. However this is not preferred since it is desired to avoid the need for a separate retainer ring.

To prevent the seal 10 from being distorted and squeezed out of the cylinder 20 through the opening 22 by the pressurized fluid or movement of the rod 34, the seal 10 has been reinforced by embedding the washer 62 or 98 therein as described above. The arrangement allows for the use of relatively soft elastomeric materials, yet avoiding the seal popping out of the cylinder. Likewise, use of the washer 62 or 98 helps maintain the shape of the seal 10 and diminishes its shrinkage over time. The frictional fit between the seal 10 in the cylinder 20 is therefore no lost.

Suitable results have been obtained using an elastomeric material for the seal 10 having a hardness of between 30 to 60 on the Shore D scale. The elastomeric material may be a castable plastic or a suitable urethane with a good "memory" so that it keeps its shape well and will return to its original shape after deformation. Hence, a spring is not usually necessary above the sealing lip 26 to maintain the shape of the lip and press it toward the surface 32. Similarly, a spring is not usually required to maintain the wiping flap 40 in contact with the surface 32.

Figure 8:
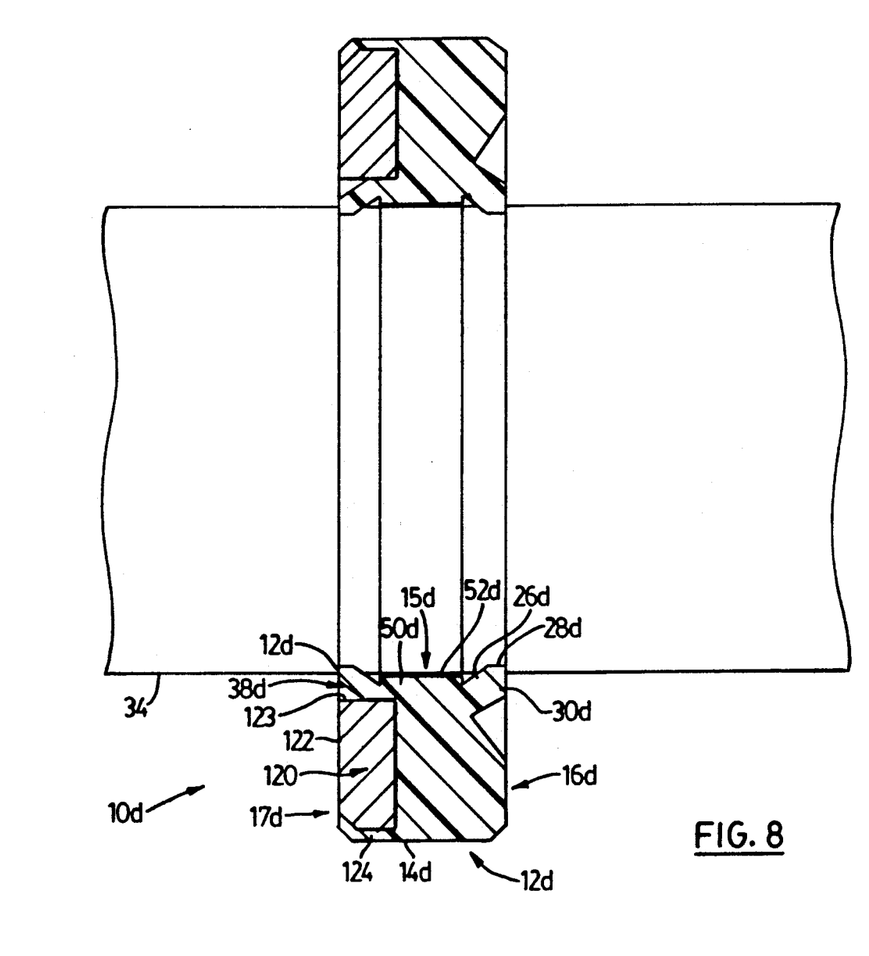
FIG. 8 is a cross-sectional view of yet another embodiment of the invention.

Another embodiment of the invention wherein the seal is reinforced by a washer is shown in FIG. 8. In FIG. 8 reference numerals with the suffix "d" indicate parts corresponding to those of FIGS. 1 to 4. In the FIG. 8 embodiment, the washer 120 is embedded in the seal 10$d$ adjacent its left face 17$d$ such that the washer's outside face 122 is coplanar with the left face 17$d$ and is adapted to abut the lip 24 of cylinder 20 (not shown in FIG. 8 but illustrated in FIG. 1A).

The washer 120 performs the functions of washers 64 and 98 as described earlier, namely the stiffening of the body 12$d$ of seal 10$d$ to help prevent the seal from being distorted and squeezed out through the opening 22 of cylinder 20 by pressurized fluid or movement of rod 34. For instance, if the seal 10$d$ is made of urethane, the body of the seal is relatively flexible in temperatures between $-30°$ C. to $65°$ C. ($150°$ F.) and is preferably reinforced with a washer to prevent it from popping out of the cylinder 20 under very high fluid pressures. In the embodiment of FIG. 8, the washer 120 extends substantially across the radial height of the body 12$d$ as measured between the outer surface 14$d$ and the guide face 52$d$ of the guide member 50$d$.

The washer 120 nearly extends to the outer surface 14$d$ of the seal 10$d$, being covered only by a thin layer 124 of elastomeric material, typically about 0.025 in. (0.635 mm) thick. The layer 124 should be thick enough so that when the seal 10$d$ is inserted into the cylinder 20, the layer 124 can compress adequately to sealingly engage the cylinder 20. The washer 120 is bevelled and the layer 124 follows this contour, as shown, to help resist the dislodging of the washer 120 from the seal 10$d$ as described earlier for the seal of FIG. 3. However, unlike the configuration in FIG. 3, the layer 124 follows the bevelled profile of the washer 120 to taper the outer edges of outer surface 14$d$. This tapered configuration allows easier mounting of the seal 10$d$ into the hollow interior 18 of the cylinder 20. The taper also provides a tight and secure fit of the seal 10$d$ into the opening 22, especially when the hollow interior is itself tapered toward the opening 22.

The washer 120 extends radially inwardly to a point just before the wipe flap 38$d$. Interference with the construction or performance of the wipe flap 38$d$ should be avoided by leaving adequate radial clearance between the washer 120 and the guide face 52$d$ or piston rod 34. Preferably, the washer 120 should be spaced radially between about 0.050 and 0.070 in. from the guide face 52$d$. In the FIG. 8 embodiment, an inside face 123 of the washer 120 is spaced 0.0495 in from the guide face 52$d$. If the washer 120 is spaced too close to the guide face 52$d$ (i.e. much less than 0.050 in.) then it begins to interfere with the construction and performance of the wiper flap 38$d$. If the washer 120 is spaced too far away from the guide face 52$d$ (i.e. much more than 0.070 in.) then very high fluid pressures at higher temperatures may in some cases distort and squeeze the seal 10$d$ out of the cylinder 20 through the opening 22.

The washer 120 may further be configured so that at least a portion of its lateral width is located in radial alignment with the guide face 52$d$ (i.e. the lateral width of the washer 120 overlaps the guide face 52$d$ by a distance indicated with the reference letter D). The lateral width of the washer may range between about 0.060 and 0.200 in. (i.e. a ratio of between 0.15 to 0.65 of the total width of the seal 10$d$), thus varying the extent of the overlap D. An advantage of overlapping the washer 120 with the guide surface 52$d$ and having the inside face 123 of the washer 120 closely spaced to the guide face 52$d$ is that the washer 120 strengthens the guide member 50$d$. The washer 120 (which is made of much stiffer material than the elastomeric material of the washer, for example metal, nylon and hard plastic)

stiffens the guide member 50d and the guide surface 52d. This arrangement provides an alternative to the configuration presented in FIG. 4 where the guide member is stiffened by replacing it with washer 98.

The length of sealing lip 26d is greater than the length of the lips 26 of the other embodiments to enhance the lip's 26d flexibility and its ability to wipe the shaft 34d. As compared to the seal of the FIG. 2 embodiment, the thickness of the second end surface 42d of the wipe flap 38d is reduced from 0.045 in. to between 0.020 and 0.030 in. The length of the wipe flap 38d is increased to 0.070 in. from 0.045 in. The angle of inclination of the flap 38d to the rod 34d remains unchanged at about 35°. Hence, the diameter of the opening defined by the wipe flap 38d is undersized by about 0.044 in. (i.e. 0.022 in. per side) rather than between 0.030 to 0.040 in. as in the FIG. 4 embodiment, for example.

Likewise, the length of the sealing lip 26d is increased in the FIG. 8 embodiment to enhance flexibility and the seal between the sealing face 28d and the rod 34d. As compared to the FIG. 2 embodiment, the first end surface 30d is roughly the same width, preferably between 0.050 and 0.070 in. wide. The length of the sealing lip 26d is increased slightly to 0.070 in. from 0.060 in. The angle of inclination of the lip 26d to the rod 34d remains unchanged at about 35°. Hence, the diameter of the opening defined by the sealing lip 26d is undersized by about 0.044 in. (i.e. 0.022 in. per side) rather than between 0.010 in. to 0.025 in. as in the FIG. 2 embodiment, for example. It is noted that the first end surface 30d of sealing lip 26d has been made coplanar, or flush, with the first face 16d to simplify the molding of the seal 10d.

The above seals have been tested and found to perform satisfactorily in automobile power steering racks at fluid pressures from 200 to 2,550 psi. The seal 10d has performed satisfactorily under pressures up to 2700 psi. In normal use, the fluid pressure in most automobile power steering racks will usually not exceed 1100 psi. The effort required to turn the steering wheel of the tested cars has also dropped significantly. In one test, for example, the effort to turn the steering wheel was reduced from 25 lbs. to 12 lbs.

Figure 9:
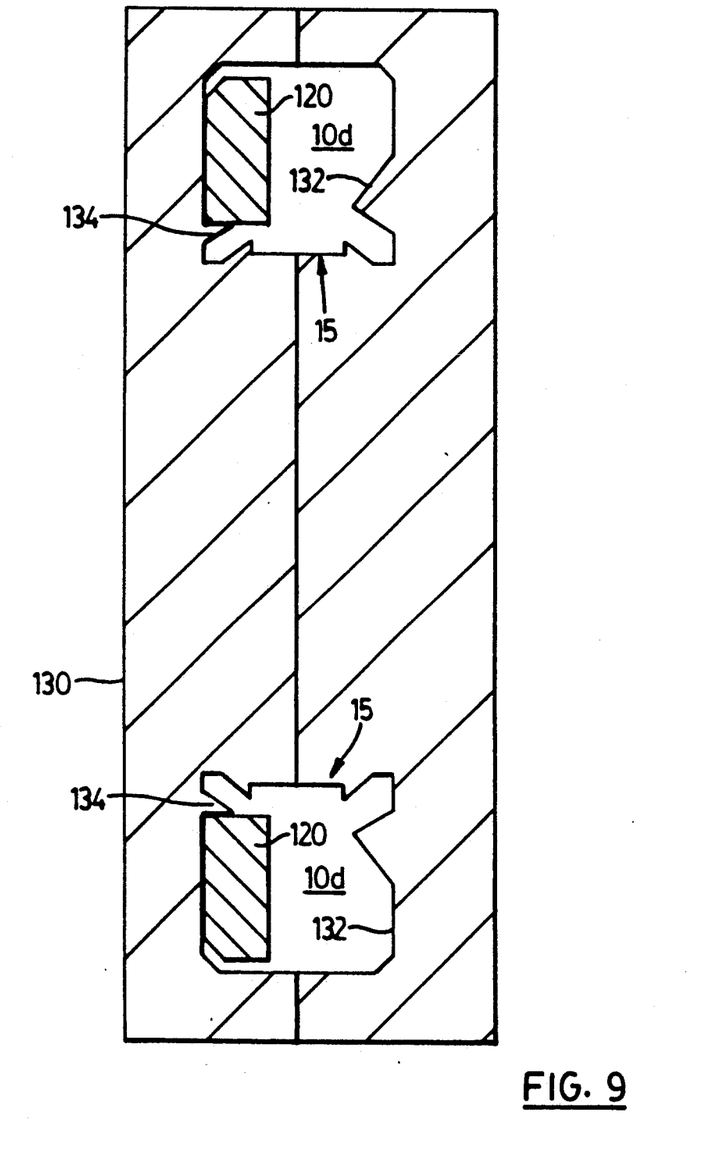
FIG. 9 is a cross-sectional view of a mold for manufacturing the embodiment of FIG. 8.

The seals 10 of the present invention may be produced using an injection molding process. FIG. 9 shows a cross-section through an injection mold 130 in a closed position for producing a seal 10d according to the FIG. 8 embodiment. It is understood that an inside surface 132 of the mold's 130 cavity is shaped in the form of the seal to be produced. Prior to injecting the cavity with elastomeric material to form the seal, a washer must be secured in the cavity in a desired orientation. An advantage of the FIG. 9 embodiment is that the mold 130 is provided with a lip 134 to form the gap between the wipe flap 38d and the inside surface 123 of the washer 120) on which the washer 120 may be conveniently and securely located prior to injection of the molding material. It will be appreciated that the inside surface 132 of the mold 130 along the seal's radially inner surface 15 may be made flat to produce seals with a planar surface 15 (i.e. "blanks"). The surface 15 can then be machined to form a wipe flap, guide member, sealing lip and the grooves therebetween to a required dimension and configuration. Hence, a single mold can be used to produce may different seals.

The above description is intended in an illustrative rather than a restrictive sense and variations to the specific configuration and materials described may be apparent to skilled persons in adapting the present invention to specific applications. Such variations are intended to form part of the present invention insofar as they are within the spirit and scope of the claims below. For example, it will be appreciated that there are a wide variety of uses for the present invention, from use in automobile power steering racks, to hoists in dump trucks, to hydraulic pistons in aircraft.

I claim:
1. A fluid seal comprising:
   (a) an annular body of an elastomeric material having a radially outer surface, a radially inner surface, and first and second opposite side faces;
   (b) said outer surface being contoured to be insertable into a generally cylindrical opening;
   (c) said inner surface having:
      (i) a radially inwardly extending sealing lip having a sealing face for slidably engaging a generally cylindrical shaft in a fluidly sealing manner, said sealing face being generally coaxial with the fluid seal, and said sealing lip having an end surface generally perpendicular to the sealing face and adjacent the first side face; and
      (iii) a radially inwardly extending wiping flap for slidably engaging the shaft, said wiping flap having a wiping face generally coaxial with the fluid seal and having an end surface generally perpendicular to the wiping face and adjacent the second side face, the width of the end surface of the sealing lip being greater than the width of the end surface of the wiping flap;
   (d) a radially inwardly extending guide member adjacent said inner surface and axially spaced between the sealing lip and the wiping flap, said guide member having a guide face adapted to slidably engage the shaft for guiding the shaft through the seal, said guide face being substantially wider than said sealing face and said guide member being adapted to resist radial movement of said shaft, thereby to limit distortion of said sealing lip, said sealing lip and said guide member being separated by a first channel therebetween, said wiping flap and guide member being separated by a second channel, and said first and second channels extending radially outwardly of the inner surface of the seal and extending around the circumference of said inner surface;
   (e) an annular washer or rigid material generally coaxial with the annular body and embedded in said body; and
   (f) a respective groove extending around each of the first and second side faces radially outwardly of the respective end surfaces.

2. A fluid seal as claimed in claim 1 wherein the width of the guide face is greater than the width of the sealing face and the width of the wiping face combined.

3. A fluid seal as claimed in claim 2 wherein said elastomeric material has a hardness of from 30 to 60 on the Shore D scale.

4. A fluid seal as claimed in claim 3 wherein said elastomeric material is a castable plastic.

5. A fluid seal as claimed in claim 3 wherein said elastomeric material is a urethane.

6. The fluid seal as claimed in claim 1 wherein the guide member is of a harder material than said elastomeric material.

7. The fluid seal as claimed in claim 1 wherein the guide member comprises a metal washer.

8. The fluid seal as claimed in claim 1 wherein the guide member comprises a metal washer, said washer being recessed within, and being co-axial with, the annular body.

9. A fluid seal as claimed in claim 1 wherein said guide member is formed as to part of its lateral width by a metal washer and as to part of its width by an elastomeric material.

10. A fluid seal as claimed in claim 9 wherein said washer has a radially inner surface, the radially inner surface of said washer being covered by a thin layer of elastomeric material.

11. A fluid seal as claimed in claim 9 wherein said radially inner surface of said annular body includes a first radially outwardly extending circumferential channel between said sealing lip and said guide face, and a second radially outwardly extending circumferential channel between said wiping flap and said guide face.

12. A fluid seal comprising:
(a) an annular body of elastomeric material having a radially outer surface, a radially inner surface and first and second opposite side faces, said outer surface being contoured to be insertable into a generally cylindrical opening;
(b) said inner surface of said body having a radially inwardly extending sealing lip having a sealing face for slidably engaging a generally cylindrical shaft in a fluidly sealing manner;
(c) a radially inwardly extending guide member adjacent said inner surface and axially spaced from said sealing lip and having a guide face adapted to slidably engage the shaft for guiding the shaft through the seal, said guide face being substantially wider than said sealing face and said guide member being adapted to resist radial movement of said shaft, thereby to limit distortion of said sealing lip, said sealing lip and said guide member being separated by a first channel therebetween, said first channel extending radially outwardly of said inner surface and extending around the circumference of said inner surface; and
(d) an annular washer of rigid material generally coaxial with the annular body and embedded in said body adjacent said second side face, at least a portion of the lateral width of said washer being located between the guide face and the outer surface of the seal to stiffen the guide member, the ratio of the lateral width of the washer to the lateral width of the annular body being about 0.15 to 0.65.

13. A fluid seal as claimed in claim 12 wherein said rigid material chosen from the group consisting of metal, nylon and hard plastic which is harder than said elastomeric material of said annular body.

14. A fluid seal comprising:
(a) an annular body of elastomeric material having a radially outer surface, a radially inner surface and first and second opposite side faces, said outer surface being contoured to e insertable into a generally cylindrical opening;
(b) said inner surface of said body having a radially inwardly extending sealing lip having a sealing face for slidably engaging a generally cylindrical shaft in a fluidly sealing manner;
(c) a radially inwardly extending guide member adjacent said inner surface and axially spaced from said sealing lip and having a guide face adapted to slidably engage the shaft for guiding the shaft through the seal, said guide face being substantially wider than said sealing face and said guide member being adapted to resist radial moment of said shaft, thereby to limit distortion of said sealing lip, said sealing lip and said guide member being separated by a first channel therebetween, said first channel extending radially outwardly of said inner surface and extending around the circumference of said inner surface; and
(d) an annular washer of rigid material generally coaxial with the annular body and embedded in said body adjacent said second side face, said washer having a radially inner surface spaced about 0.050 to 0.070 inches radially outwardly of said guide face.

15. A fluid seal as claimed in claim 12 wherein said sealing lip is adjacent said first side face, said inner surface further having a radially inwardly extending wiping flap for slidably engaging the shaft, said wiping flap being adjacent said second side face, said guide member being between the sealing lip and the wiping flap.

16. A fluid seal as claimed in claim 15 wherein the guide member and wiping flap are spaced axially apart and define a second channel extending between the guide member and the wiping flap, said second channel extending radially outwardly of the inner surface of the seal and extending about its circumference.

17. A fluid seal as claimed in claim 15 wherein said sealing face is generally coaxial with the fluid seal and said sealing lip has an end surface generally perpendicular to the sealing face and adjacent the first side face.

18. A fluid seal as claimed in claim 17 wherein said wiping flap has a wiping face generally coaxial with the fluid seal and has an end surface generally perpendicular to the wiping face and adjacent the second side face.

19. A fluid seal as claimed in claim 18 wherein a respective groove extends around each of the first and second side faces radially outwardly of the respective end surfaces.

20. A fluid seal as claimed in claim 1 or 14 wherein said rigid material comprises steel.

21. A fluid seal as claimed in claim 1 or 14 wherein the outside diameter of said washer is smaller than the diameter of said outer surface of the seal.

22. A fluid seal as claimed in claim 1 or 14 wherein said second side face of the seal is coplanar with an outside surface of said washer.

23. A fluid seal as claimed in claim 16 wherein the width of the first channel is greater than the width of the second channel.

24. A fluid seal as claimed in claim 16 wherein the first and second channels are generally V-shaped.

25. A fluid seal as claimed in claim 1, 12 or 14 wherein said radially outer surface has a stepped profile to define a larger diameter part adjacent said first side face and a smaller diameter part adjacent said second side face.

26. A fluid seal as claimed in claim 25 wherein said smaller diameter part of said outer surface has a radially inwardly extending groove about its circumference for receiving an O ring.

27. A fluid seal as claimed in claim 12 or 14 wherein said washer extends radially substantially between the radially outer and inner surfaces of the annular body.

28. A fluid seal as claimed in claim 12 or 14 wherein said washer has a radially outer surface, the radially outer surface of said washer being covered by a thin layer of elastomeric material.

* * * * *